United States Patent
Reierson

(10) Patent No.: US 9,841,976 B2
(45) Date of Patent: *Dec. 12, 2017

(54) LOCK FREE STREAMING OF EXECUTABLE CODE DATA

(71) Applicant: Microsoft Technology Licensing, LLC, Redmond, WA (US)

(72) Inventor: Kristofer Reierson, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,794

(22) Filed: Sep. 6, 2016

(65) Prior Publication Data

US 2016/0371083 A1    Dec. 22, 2016

Related U.S. Application Data

(63) Continuation of application No. 13/560,216, filed on Jul. 27, 2012, now Pat. No. 9,436,474.

(51) Int. Cl.
   *G06F 9/30* (2006.01)
   *G06F 9/38* (2006.01)

(52) U.S. Cl.
   CPC ........ *G06F 9/3016* (2013.01); *G06F 9/30145* (2013.01); *G06F 9/30149* (2013.01);
   (Continued)

(58) Field of Classification Search
   None
   See application file for complete search history.

(56) References Cited

U.S. PATENT DOCUMENTS

| 5,768,575 A | 6/1998 | McFarland et al. |
| 5,946,484 A | 8/1999 | Brandes |

(Continued)

FOREIGN PATENT DOCUMENTS

| CN | 101233495 A | 7/2008 |
| CN | 101853148 A | 10/2010 |

(Continued)

OTHER PUBLICATIONS

'Verifying the ARM Block Data Transfer Instructions' by Anthony Fox, archived online beginning on Aug. 7, 2004.*

(Continued)

*Primary Examiner* — Steven Snyder
(74) *Attorney, Agent, or Firm* — The Watson IP Group, PLC; Vladan M. Vasiljevic

(57) ABSTRACT

A disassembler receives instructions and disassembles them into a plurality of separate opcodes. The disassembler creates a table identifying boundaries between each opcode. Each opcode is written to memory in an opcode-by-opcode manner by atomically writing standard blocks of memory. Debug break point opcodes are appended to opcode to create a full block of memory when needed. The block of memory may be thirty-two or sixty-four bits long, for example. Long opcodes may overlap two or more memory blocks. Debug break point opcodes may be appended to a second portion of the long opcode to create a full block of memory. A stream fault interceptor identifies when a requested data page is not available and retrieving the data page.

20 Claims, 3 Drawing Sheets

(52) U.S. Cl.
CPC .......... *G06F 9/30181* (2013.01); *G06F 9/382* (2013.01); *G06F 9/3802* (2013.01); *G06F 9/3816* (2013.01)

(56) References Cited

U.S. PATENT DOCUMENTS

| | | | |
|---|---|---|---|
| 6,009,508 A * | 12/1999 | May | G06F 9/30149 711/100 |
| 6,077,312 A | 6/2000 | Bates et al. | |
| 6,119,115 A | 9/2000 | Barr | |
| 6,212,574 B1 | 4/2001 | O'Rourke et al. | |
| 6,253,309 B1 | 6/2001 | Mahalingaiah | |
| 6,282,698 B1 | 8/2001 | Baker et al. | |
| 6,339,820 B1 | 1/2002 | Baentsch et al. | |
| 6,397,273 B2 | 5/2002 | Chilton | |
| 6,408,382 B1 | 6/2002 | Pechanek et al. | |
| 6,564,314 B1 * | 5/2003 | May | G06F 9/30156 712/210 |
| 6,708,326 B1 * | 3/2004 | Bhattacarya | G06F 11/362 712/227 |
| 7,444,500 B1 | 10/2008 | Jones | |
| 7,581,082 B2 | 8/2009 | Hahn et al. | |
| 8,601,246 B2 | 12/2013 | Peleg et al. | |
| 8,769,504 B2 * | 7/2014 | Jeong | G06F 9/4425 714/38.1 |
| 9,389,866 B2 * | 7/2016 | Gilbert | G06F 9/3016 |
| 9,600,284 B2 * | 3/2017 | Gilbert | G06F 9/3016 |
| 9,619,346 B2 * | 4/2017 | Pape | G06F 11/1484 |
| 2003/0023960 A1 | 1/2003 | Khan et al. | |
| 2004/0059641 A1 | 3/2004 | Brown et al. | |
| 2004/0268090 A1 | 12/2004 | Coke et al. | |
| 2006/0277438 A1 | 12/2006 | Pedersen | |
| 2007/0006189 A1 * | 1/2007 | Li | G06F 9/45516 717/141 |
| 2007/0038990 A1 * | 2/2007 | White | G06F 8/65 717/168 |
| 2007/0079177 A1 * | 4/2007 | Spirakis | G06F 11/3409 714/34 |
| 2007/0079296 A1 | 4/2007 | Li et al. | |
| 2007/0168736 A1 | 7/2007 | Ottavi et al. | |
| 2008/0127125 A1 | 5/2008 | Anckaert et al. | |
| 2009/0037710 A1 * | 2/2009 | Mavinakayanahalli | G06F 11/3644 712/244 |
| 2009/0138625 A1 | 5/2009 | Lee et al. | |
| 2009/0282220 A1 | 11/2009 | Norden | |
| 2009/0307528 A1 | 12/2009 | Byers et al. | |
| 2010/0070803 A1 | 3/2010 | Carlson et al. | |
| 2010/0251220 A1 * | 9/2010 | Jeong | G06F 9/4425 717/128 |
| 2010/0287359 A1 | 11/2010 | Norden | |
| 2012/0079459 A1 | 3/2012 | Bates et al. | |
| 2012/0179895 A1 | 7/2012 | Venkataramanan et al. | |
| 2013/0047037 A1 | 2/2013 | Moyer | |
| 2013/0318398 A1 * | 11/2013 | Arapov | G06F 11/362 714/32 |
| 2015/0095625 A1 * | 4/2015 | Hassanein | G06F 9/30181 712/226 |
| 2015/0121135 A1 * | 4/2015 | Pape | G06F 11/1484 714/15 |

FOREIGN PATENT DOCUMENTS

| | | | |
|---|---|---|---|
| EP | 0417013 A2 | 3/1991 | |
| EP | 0889412 A2 * | 1/1999 | ......... G06F 13/1673 |

OTHER PUBLICATIONS

'Introducing Shared-Memory Concurrency—Race Conditions and Atomic Blocks' by Laura Effinger-Dean, Nov. 19, 2007.*
'Understanding and Using Atomic Memory Operations' by Lars Nyland & Stephen Jones, GTC 2013.*
'Understanding Intel Instruction Sizes' by William Swanson, copyright 2003.*
'Endianness White Paper' by Intel, Nov. 15, 2004.*
"Parallel Programming with Microsoft Visual Studio 2010: Introduction to Parallel Programming—Multicore Computing & Speedup", Retrieved From <<http://mscerts.programming4.us/programming/parallel%20programming%20with%20microsoft%20visual%20studio%202010%20%20%20introduction%20to%20parallel%20programming%20-%20multicore%20computing%20%20%20speedup.aspx>>, Jul. 29, 2011, 6 Pages.
"First Office Action and Search Report Issued in Chinese Patent Application No. 201380039991.8", dated Jun. 23, 2016, 14 Pages.
Mishra, Sudhindra N., "The Vax 8800 microarchitecture", In Proceedings of Thirty-Second IEEE Computer Society International Conference, COMPCON'87, Feb. 2, 1987, pp. 322-327.
"International Search Report and Written Opinion Issued in PCT Application No. PCT/US2013/052153", dated Nov. 12, 2013, 11 Pages.
Rusling, David D., "Chapter 3: Memory Management", In Book the Linux Kernel, Jul. 15, 1999, 18 Pages.

* cited by examiner

LOCK FREE STREAMING OF EXECUTABLE CODE DATA

CROSS REFERENCE TO RELATED APPLICATION

This application is a continuation of U.S. patent Ser. No. 13/560,216 filed Jul. 27, 2012 entitled "Lock Free Streaming of Executable Code Data", the entire Specification of which is hereby incorporated by reference.

BACKGROUND

A race condition occurs when commands to read and write data are received at the same time. This can also happen, for example, when a thread is executing a packet of executable data from memory at the same time that a write thread is delivering the data to the memory. The result may be a computer crash, program shutdown, reading/writing errors, or other problems. In one solution, the executing thread may be suspended while waiting for the writing thread to provide the data. However, suspending a thread can cause performance problems for related processes. For example, dozens or hundreds of threads may be running for a process in which only one or a few threads access the data, but all of the threads may have to be suspended to wait for the data delivery every time a stream fault occurs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments allow executable code to be delivered in a lock-free manner by disassembling it and ordering the writes to the memory page. This allows the executable code to remain in a consistent state throughout the delivery of streaming data. Because the memory is in a consistent state, other threads may continue to execute while the byte-code is written into memory. This allows for greater scalability and performance.

Further embodiments enable streaming of executable code data in user mode, without suspending the entire process or using a kernel mode component.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIGS. 1A-D illustrate the ordering of the memory writes over time according to one embodiment.

DETAILED DESCRIPTION

Figure 1A:
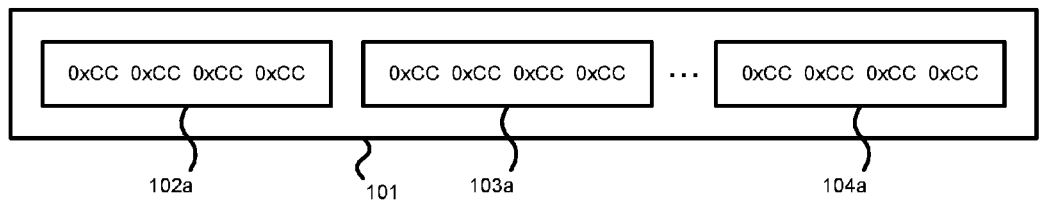

The lock-free solution described herein takes advantage of two features of a modern processor. First, the processor provides an atomic thirty-two bit or sixty-four bit memory access write. This guarantees that the processor will see all thirty-two bits or sixty-four bits in memory. Second, the processor has a one-byte debug break exception operation code (opcode). This debug break opcode allows the processor to retry reading and executing opcodes from the memory without causing a calling thread to fail.

In one embodiment, code is disassembled in memory before the instructions are made available to a processor. This disassembly allows for creation of an ordered list of memory writes consisting of a number of separate thirty-two bit or sixty-four bit writes. This disassembly and analysis can be performed either on a client or on a server. Performing this operation on the client saves network transmissions at the cost of increased processor cycles, while performing the operation on the server means larger network transmissions but requires less processor operation at the client node.

When the memory page is allocated, the entire page is written with one-byte exception codes. A stream fault handler keeps a list of pages and locations that have been written to or that are invalid.

The opcodes are written to memory using the disassembled thirty-two bit or sixty-four bit blocks starting at the end of the page. Alternately, the assembly tree can be analyzed to identify leaf opcodes, which are opcodes that are called by other opcodes. The leaf opcodes may be identified by a traversal of the opcode execution call graph. These leaf opcodes may be written to memory first.

For opcodes that are thirty-two bits or smaller (or sixty-four bit or smaller in other embodiments), the entire opcode is written to memory so that the processor will execute the instruction successfully. If the opcode is larger than thirty-two bits (or larger than sixty-four bits in other embodiments), then the "end" of the opcode is written first. By writing the end of the opcode first, if the processor executes the instruction while the opcode is still being written, then the processor will execute the debug break opcode first. This allows the stream fault handler to finish writing the opcode and so that the processor can retry the opcode. If the thirty-two bit (or sixty-four bit) write straddles more than one opcode, then a debug break opcode is written to allow retry. If the thirty-two bit (or sixty-four bit) write has already been written, then the previous value is written in which case the opcode remains valid.

By writing the disassembled opcodes spaced by debug breaks, the processor will encounter either an invalid debug breakpoint or valid executable code. If the application executes an invalid debug breakpoint, then a stream fault interceptor as described herein will intercept the exception before it is delivered to the application. The stream fault interceptor waits until the memory is valid and then retries the opcode. The stream fault interceptor can use the table of pages and written opcodes to differentiate between a breakpoint that occurs as a part of stream faulting, which must be retried, or one used by a debugger or the application, which must be passed back to the application. In the case of valid executable code, the application executes code successfully.

As a result, the stream fault handler does not need to suspend all of the threads in the process when delivering the results of a stream fault.

FIGS. 1A-D illustrate the ordering of the memory writes over time according to one embodiment. Program code used in this example comprises the instructions: 0xAB 0xE9 0x00 0xFE 0x70 0x08 . . . . A disassembler breaks this code into the following opcodes:

(1): 0xAB
(2): 0xE9 0x00 0xFE 0x70 0x08
(3): . . .

The first opcode is one byte long, the second opcode is five bytes long, and additional opcodes of various lengths are identified in a similar manner.

Memory 101 comprises a number of thirty-two bit blocks 102-104. In other embodiments, the memory blocks may be sixty-four bits or some other size. FIG. 1A illustrates an original state in which all of memory 101 is filled with one byte debug break point opcodes 0xCC. If a thread reads instructions from memory 101 at this time, the debug break point opcode will cause the stream handler to attempt to load code to memory 101 and then the thread will retry reading code.

Figure 1B:
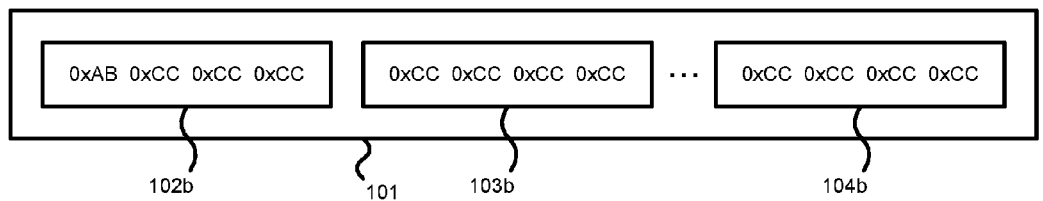

In FIG. 1B, the first opcode 0xAB has been written to thirty-two bit block 102b. The first, one-byte opcode 0xAB is written into memory 101 with an atomic write that replaces the first 0xCC. The write operation needs to write thirty-two bits of data. Because the instruction has been disassembled before writing to memory, the write operation tracks what bytes are being written and knows to fill the remaining twenty-four bits of block 102b with 0xCC to fill up the entire thirty-two bit block. If the processor executes the first instruction 0xAB, it will succeed. However, if the processor attempts to execute the second instruction at this time, the debug break point 0xCC will be read and a stream fault retry mechanism will take over.

The stream fault handler now needs to write the second opcode (i.e., 0xE9 0x00 0xFE 0X70 0x08). The stream fault handler knows the previous instruction (0xAB) was written and knows how blocks 102b-104b were written. The stream fault handler also knows how long the next opcode is and how it needs to be written to memory 101. In particular, the stream fault handler knows that the second, five-byte opcode will be written to blocks 102b and 103b after opcode 0xAB. The stream fault handler also determines that the second opcode will not fit into the remaining space in a single thirty-two bit block 102b. Therefore, the second opcode must be divided between memory blocks 102b and 103b.

Figure 1C:
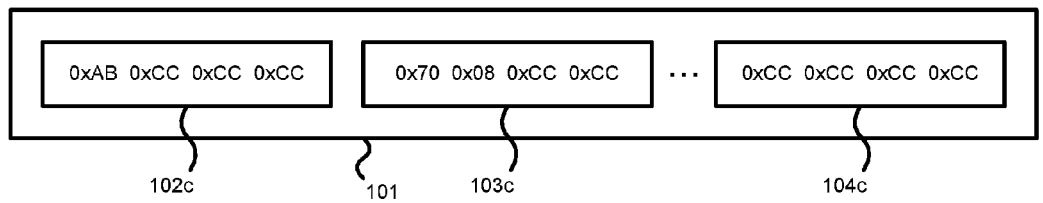

As illustrated in FIG. 1C, the second portion of the opcode (i.e., 0x70 0x08) is written to block 103c—padded with debug break points 0x00 to fill thirty-two bits—before writing the first portion of the opcode. By writing the second portion of the opcode first, if the processor executes the opcode after the 0xAB block, then the processor will incur a debug fault (0xCC) and will not attempt to execute garbage.

Figure 1D:
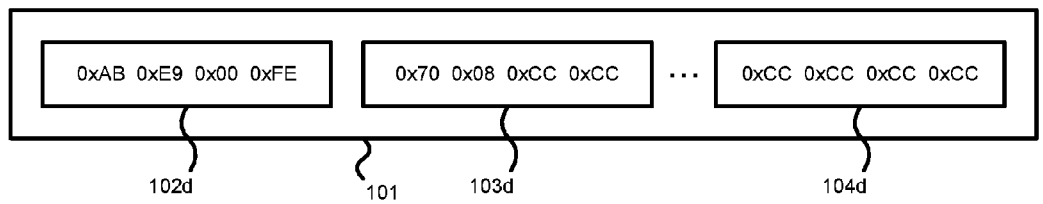

After the second portion of the opcode is written to block 103c, then the first potion (i.e., 0xE9 0x00 0xFE) can be written to memory 101. As illustrated in FIG. 1D, this first portion is written with the first opcode 0xAB in the position that it was previously assigned in block 102d. At this time, the processor will be able to successfully execute both instructions. This process of writing instructions to memory 101 may be applied opcode-by-opcode until the entire page is resident.

Figure 2:
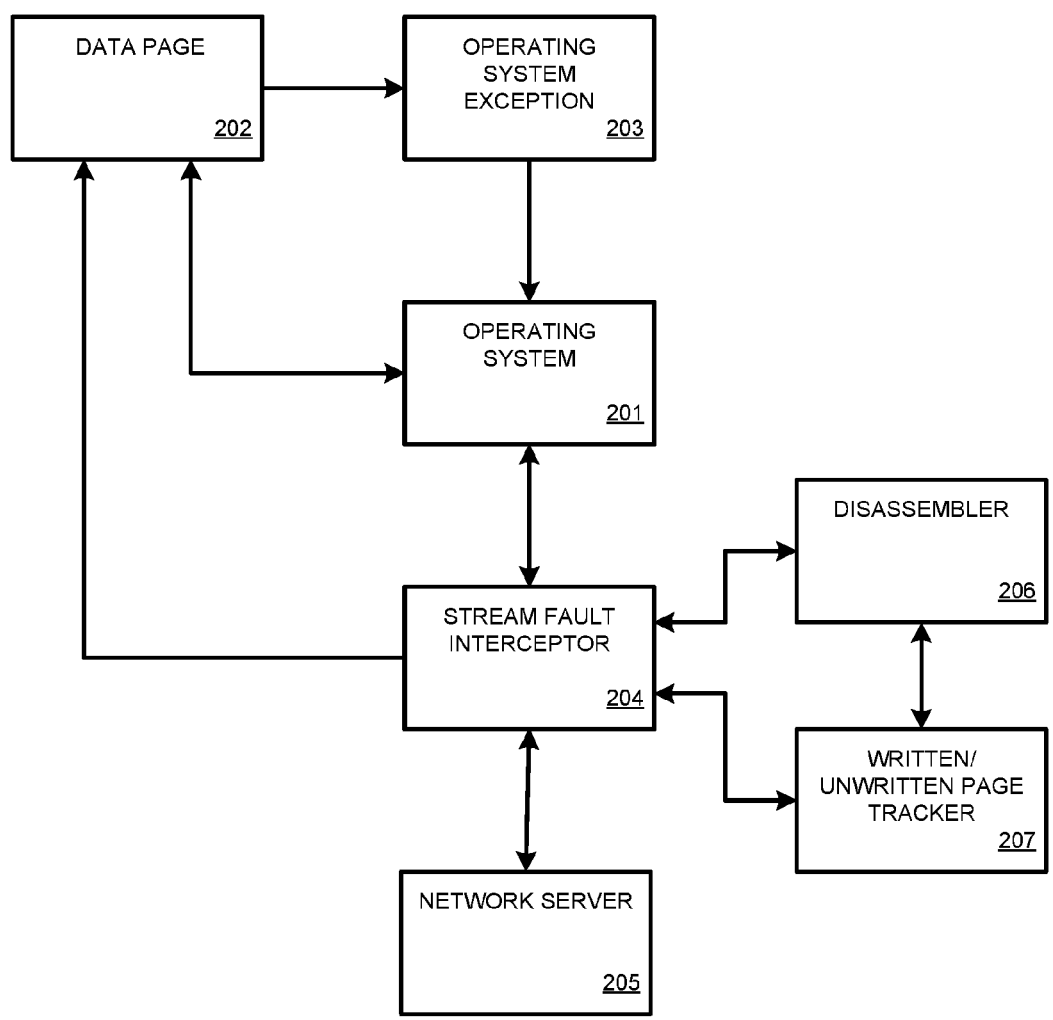
FIG. 2 illustrates a system for streaming lock-free executable code data according to one embodiment.

FIG. 2 illustrates a system for streaming lock-free executable code data according to one embodiment. An application running on operating system 201 attempts to read a data page 202 from memory. When a non-resident page of executable memory is called, this triggers operating system exception 203, which notifies the operating system 201 that this call failed. Operating system 201 sends a read-failure return code to stream fault interceptor 204 before the application sees the fault. Stream fault interceptor 204 looks up the page in its database and determines that it needs to retrieve the page. Stream fault interceptor 204 makes a network call to get the page from network server 205, for example, and changes the memory access of the page so that it can write the data to data page 202.

In existing systems, stream fault interceptor 204 would need to suspend the process that requested the data. If the process is not suspended, then another thread could execute data on page 202 as it was being written into memory and the process would crash when it attempted to execute partial data. After the page 202 was written to memory, then the process could be resumed with stream fault interceptor changing the operating system exception to "success" and the application continuing to execute.

In existing systems, this step of suspending the entire process is necessary because changing access to data page 202 and writing data to it cannot be accomplished in a single step. This means that two threads in the process cannot be executing when you are servicing a stream fault.

The existing systems are improved herein by adding disassembler 206 and written/unwritten page tracker 207. Disassembler 206 is responsible for taking the returned byte-code and disassembling it. Disassembler 206 returns a list of offsets that contain the boundaries of each opcode. As noted in the example of FIG. 1, each opcode may be one or more bytes long. Written/unwritten page tracker 207 contains the list of offsets generated by the disassembler 206 as well as a list of those offsets that have been committed.

The process does not need to be suspended when using disassembler 206 and written/unwritten page tracker 207. Instead, after the requested code is returned to stream fault interceptor 204 from the server 205, the disassembler is called to generate the offset map. The offset map is then stored by the stream fault interceptor 204, which begins writing opcodes to data page 202 in an opcode-by-opcode manner as described above. The stream fault interceptor 204 consults this offset map to determine the boundary of each opcode. The stream fault interceptor 204 may write the opcodes to data page 202 in any appropriate order starting with either the beginning or the end of the list of opcodes.

If any contention occurs, such as if the processor executes a partially filled instruction, then the operating system fault mechanism 203 will be triggered. This will cause the stream fault interceptor 204 to be invoked by operating system 201. The stream fault interceptor 204 consults written/unwritten page tracker 207 and either writes the opcode itself to data page 202 or waits until another thread finishes writing the data. Stream fault interceptor 204 then retries the exception.

Figure 3:
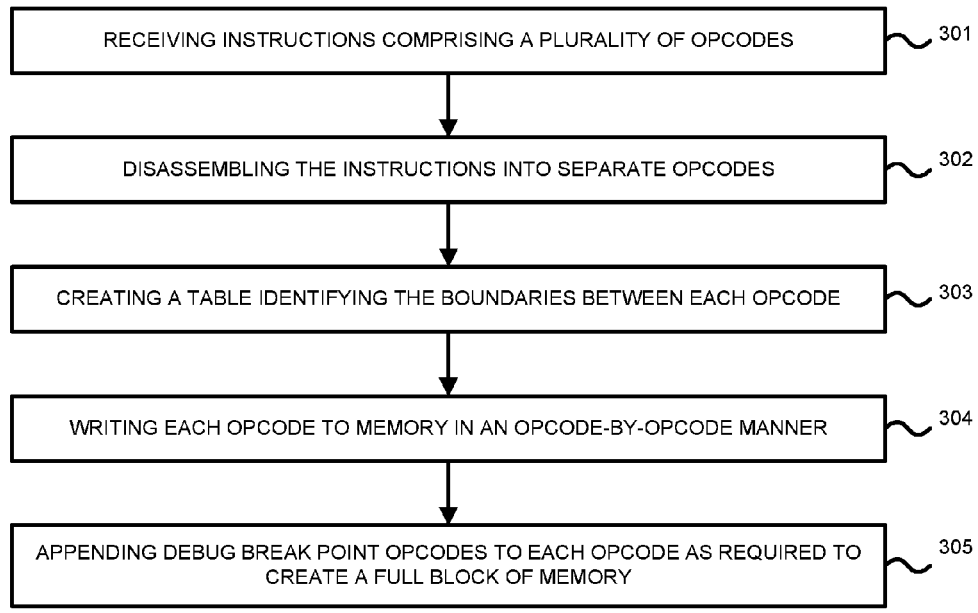
FIG. 3 is a flowchart of a process or method for streaming executable code data according to one embodiment.

FIG. 3 is a flowchart of a process or method for streaming executable code data according to one embodiment. In step 301, a processor receives instructions comprising a plurality of opcodes. Each of the opcodes may comprise one or more bytes of data. In step 302, a disassembler is used to disassemble the instructions into separate opcodes. In step 303, a table is created that identifies the boundaries between each opcode. The table may be stored in a written/unwritten page tracker, for example. In step 304, each opcode is written to memory in an opcode-by-opcode manner by atomically writing standard blocks of memory. The opcodes may be written to memory by a stream fault interceptor, for example.

In some embodiments, debug break point opcodes may be written to all memory locations to initialize the memory. When the opcodes are written to memory, debug break point opcodes may be appended to the opcode to create a full standard block of memory. The standard block of memory may be thirty-two bits or sixty-four bits long, for example.

When a long opcode will overlap two or more standard blocks of memory, then it may be divided into two portions. The second portion of the long opcode is written to a second memory block, and then the first portion of the long opcode is written to a first memory block. Writing the long opcode in this manner will ensure that a debug break point will be encountered if a memory location is read before the entire opcode is written. Debug break point opcodes may be appended to the second portion of the long opcode to create a full standard block of memory. A previous opcode may be written along with the first portion of the long opcode to the first memory block.

It will be understood that steps 301-305 of the process illustrated in FIG. 3 may be executed simultaneously and/or sequentially. It will be further understood that each step may be performed in any order and may be performed once or repetitiously.

Figure 4:
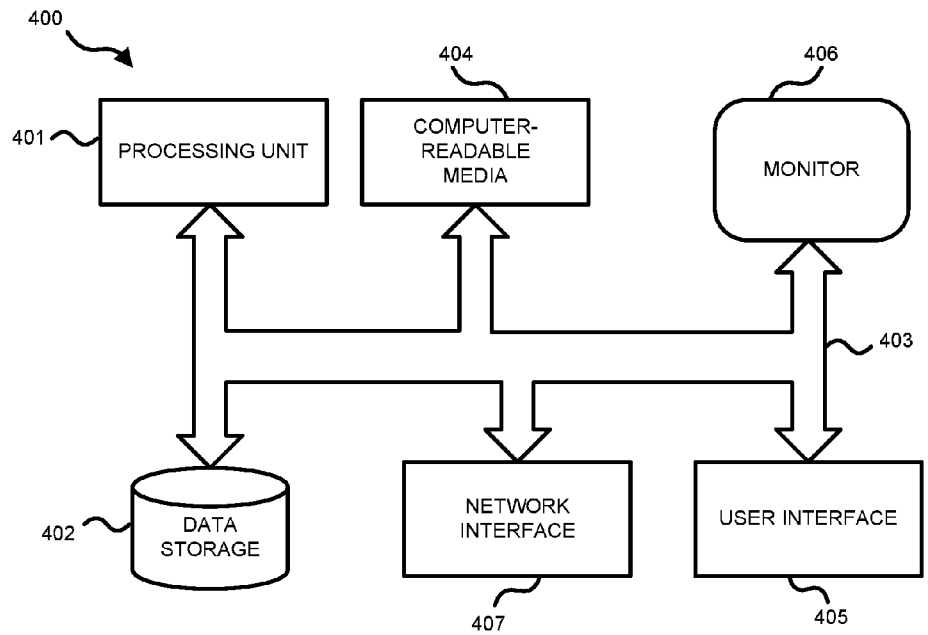
FIG. 4 illustrates an example of a suitable computing and networking environment to provide lock free streaming of executable code data.

FIG. 4 illustrates an example of a suitable computing and networking environment 400 on which the examples of FIGS. 1-3 may be implemented to provide lock free streaming of executable code data. The computing system environment 400 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 400. Components may include, but are not limited to, various hardware components, such as processing unit 401, data storage 402, such as a system memory, and system bus 403 that couples various system components including the data storage 402 to the processing unit 401. The system bus 403 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 typically includes a variety of computer-readable media 404. Computer-readable media 404 may be any available media that can be accessed by the computer 400 and includes both volatile and nonvolatile media, and removable and non-removable media, but excludes propagated signals. By way of example, and not limitation, computer-readable media 404 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 402 includes computer storage media in the form of volatile and/or nonvolatile memory such as read only memory (ROM) and random access memory (RAM). Memory 402 or computer readable media 404 may be used to store data pages, opcode boundary lists, opcodes, and the like. A basic input/output system (BIOS), containing the basic routines that help to transfer information between elements within computer 400, such as during start-up, is typically stored in ROM. RAM typically contains data and/or program modules that are immediately accessible to and/or presently being operated on by processing unit 401. By way of example, and not limitation, data storage 402 holds an operating system, application programs, and other program modules and program data. An operating system running on processing unit 402 may support functions such as operating system exception 203, stream fault interceptor 204, disassembler 206, and/or written/unwritten page tracker 207 (FIG. 2).

Data storage 402 may also include other removable/non-removable, volatile/nonvolatile computer storage media. By way of example only, data storage 402 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 405 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 401 through a user input interface 405 that is coupled to the system bus 403, but may be connected by other interface and bus structures, such as a parallel port, game port or a universal serial bus (USB). A monitor 406 or other type of display device is also connected to the system bus 403 via an interface, such as a video interface. The monitor 406 may also be integrated with a touch-screen panel or the like. Note that the monitor and/or touch screen panel can be physically coupled to a housing in which the computing device 400 is incorporated, such as in a tablet-type personal computer. In addition, computers such as the computing device 400 may also include other peripheral output devices such as speakers and printer, which may be connected through an output peripheral interface or the like.

The computer 400 may operate in a networked or cloud-computing environment using logical connections 407 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public or private network through a network interface or adapter 407. Network interface 407 may provide a connection to a remote device, such as a network server 205 (FIG. 2). In some embodiments, a modem or other means for establishing communications over the network. The modem, which may be internal or external, may be connected to the system bus 403 via the network interface 407 or other appropriate mechanism. A wireless networking component such as comprising an interface and antenna may be coupled through a suitable device such as an access point or peer computer to a network. In a networked environment, program modules depicted relative to the computer 400, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of writing a long opcode that overlaps two or more atomically writable blocks of memory, comprising:
    atomically writing, by a computing device, a latter portion of the long opcode to a second atomically writable block of memory of the computing device, the latter portion of the long opcode being after a prior portion of the long opcode; and
    atomically writing, by the computing device, the prior portion of the long opcode to a first atomically writable block of memory of the computing device;
    wherein the atomically writing the prior portion is performed after the atomically writing the latter portion; and
    wherein further the second atomically writeable block of memory comprises both debug break point opcodes and the latter portion of the long opcode after the atomically writing the latter portion.

2. The method of claim 1, further comprising:
    appending, by the computing device, the debug break point opcodes to the latter portion of the long opcode to create a full standard block of memory.

3. The computer-implemented method of claim 1, further comprising:
    writing, by the computing device, a previous opcode and the prior portion of the long opcode to the first memory block.

4. The method of claim 1, wherein prior to the atomically writing the latter portion of the long opcode, the first atomically writable block of memory contains a debug break point opcode at an address the prior portion of the long opcode is to be written to.

5. The method of claim 1, wherein prior to the atomically writing the latter portion of the long opcode, ensuring the two or more atomically writable blocks of memory contain debug break point opcodes.

6. The method of claim 1, further comprising:
    retrying, by the computing device, a fault mechanism after writing the prior portion of the long opcode, the fault mechanism having been triggered by a debug break point opcode that was present in the first atomically writable block of memory at an address the prior portion of the long opcode was subsequently written to.

7. The method of claim 6, wherein the fault mechanism is either a stream fault interceptor or an operating system fault mechanism.

8. The method of claim 1, wherein the first atomically writable block of memory precedes the second atomically writable block of memory.

9. A computer system, comprising:
    one or more processors;
    system memory; and
    one or more computer-readable storage media having stored thereon computer-executable instructions that, when executed by the one or more processors, cause the processors to:
        initialize blocks of memory, prior to storing new opcodes in the block of memory, by writing debug break point opcodes to all memory locations of the blocks of memory being initialized, the debug break point opcodes faulting to a fault mechanism; and subsequently write the new opcodes to the initialized memory by overwriting at least some of the debug break point opcodes.

10. The computer system of claim 9, wherein the one or more computer-readable storage media comprise further computer-executable instructions that, when executed by the one or more processors, cause the one or more processors to:
identify when a long opcode will overlap two or more standard blocks of memory;
write a latter portion of the long opcode to a second memory block, the latter portion of the long opcode being after a prior portion of the long opcode; and
write the prior portion of the long opcode to a first memory block after the writing of the latter portion.

11. The computer system of claim 10, the processor further operating to:
append debug break point opcodes to the latter portion of the long opcode in to create a full standard block of memory.

12. The computer system of claim 10, the processor further operating to:
write a previous opcode and the prior portion of the long opcode to the first memory block.

13. The computer system of claim 9, wherein the fault mechanism is a stream fault interceptor operating to identify when a requested data page is not available.

14. The computer system of claim 13, wherein the stream fault interceptor identifies when the requested data page is not available by differentiating between a breakpoint that occurs as part of stream faulting, in which case the stream fault interceptor identifies the requested data page as not available, and a breakpoint associated with a debugger or application, in which case the stream fault interceptor passes the breakpoint back to the debugger or the application.

15. The computer system of claim 14, wherein the stream fault interceptor performs the differentiating based on a table that identifies boundaries between each opcode.

16. The computer system of claim 9, further comprising:
a page tracker maintaining a table that identifies boundaries between each opcode.

17. The computer system of claim 9, wherein the one or more computer-readable storage media comprise further computer-executable instructions that, when executed by the one or more processors, cause the one or more processors to:
append the debug break point opcodes to an opcode to create a full standard block of memory;
wherein the writing the opcodes comprises atomically writing standard blocks of memory.

18. A computer system, comprising:
one or more processors; and
computer-readable data storage storing computer-executable instructions that when executed by at least one processor of the one or more processors causes the computer system to:
receive an exception notification that a breakpoint has been encountered at a memory location requested by a memory access request;
differentiate between a breakpoint that occurs as part of stream faulting and a breakpoint associated with a debugger or application;
retry the memory access request after a writing of data to the memory location completes if the differentiating determines that the breakpoint is a breakpoint that occurs as part of stream faulting; and
pass the exception notification back to the debugger or the application if the differentiating determines that the breakpoint is the associated with the debugger or the application.

19. The computer system of claim 18, wherein blocks of memory are initialized by writing debug break point opcodes to all memory locations prior to writing opcodes to the initialized memory by overwriting at least some of the debug break points, the debug break point opcodes triggering the fault.

20. The computer system of claim 19, wherein the differentiating comprises referencing a table that identifies boundaries between each of the opcodes written to the initialized memory.

* * * * *